(12) United States Patent
Forsblom

(10) Patent No.: US 9,794,495 B1
(45) Date of Patent: Oct. 17, 2017

(54) MULTIPLE STREAMING CAMERA NAVIGATION INTERFACE SYSTEM

(71) Applicant: Adtile Technologies Inc., San Diego, CA (US)

(72) Inventor: Nils Forsblom, San Diego, CA (US)

(73) Assignee: Adtile Technologies Inc., San Diego, CA (US)

( * ) Notice: Subject to any disclaimer, the term of this patent is extended or adjusted under 35 U.S.C. 154(b) by 0 days.

(21) Appl. No.: 15/634,818

(22) Filed: Jun. 27, 2017

Related U.S. Application Data

(60) Provisional application No. 62/354,810, filed on Jun. 27, 2016.

(51) Int. Cl.
*H04N 21/218* (2011.01)
*H04N 21/472* (2011.01)
*H04N 5/247* (2006.01)
*H04N 21/4223* (2011.01)

(52) U.S. Cl.
CPC ....... *H04N 5/247* (2013.01); *H04N 21/21805* (2013.01); *H04N 21/4223* (2013.01); *H04N 21/47202* (2013.01)

(58) Field of Classification Search
None
See application file for complete search history.

(56) References Cited

U.S. PATENT DOCUMENTS

2003/0103149 A1* 6/2003 Kinjo ............... G06F 17/30265
348/231.5
2017/0150118 A1* 5/2017 Pacheco ............... H04N 13/025

\* cited by examiner

*Primary Examiner* — Mark T Monk
(74) *Attorney, Agent, or Firm* — Stetina Brunda Garred & Brucker

(57) ABSTRACT

A multiple streaming camera interface system includes a data processor and a network interface that establishes a data link to a streaming server. The streaming server is in communication with one or more camera streams generated by corresponding ones of imaging devices capturing footage from specific locations. A streaming client is connectible to the streaming server over the data link. The one or more camera streams are selectively relayed by the streaming server to the streaming client. A graphical interface is executed by the data processor, and a first one of the one or more camera streams, which includes a hotspot to a second one of the one or more camera streams, is displayed on the graphical interface. In response to an activation of the hotspot, the second one of the one or more camera streams is displayed on the graphical interface.

20 Claims, 11 Drawing Sheets

MULTIPLE STREAMING CAMERA NAVIGATION INTERFACE SYSTEM

CROSS-REFERENCE TO RELATED APPLICATIONS

The present application relates to and claims the benefit of U.S. Provisional Application No. 62/354,810 filed Jun. 27, 2016 and entitled "MULTIPLE OMNIDIRECTIONAL LIVE STREAMING CAMERA NAVIGATION INTERFACE SYSTEM," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to human-computer interfaces and mobile devices, and more particularly, to a multiple streaming camera navigation interface system.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Additionally, various on-board sensors may be utilized to accept motion input, providing a further level of interactivity. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers, gyroscopes, and compasses/magnetometers that can sense motion and direction. For portability purposes, all of these components are powered by an on-board battery. In order to accommodate the low power consumption requirements, ARM (Advanced RISC/Reduced Instruction Set Computer Machine) architecture processors have been favored for mobile devices. Several distance and speed-dependent communication protocols may be implemented, including longer range cellular network modalities such as GSM (Global System for Mobile communications), CDMA (Code Division Multiple Access), and so forth, high speed local area networking modalities such as WiFi, and short-range device-to-device data communication modalities such as Bluetooth.

Management of these hardware components is performed by a mobile operating system, also referenced in the art as a mobile platform. Currently, popular mobile platforms include Android from Google, Inc., iOS from Apple, Inc., and Windows Phone, from Microsoft, Inc. These three platforms account for over 98.6% share of the domestic U.S. market. There are other less popular, though significant mobile platforms such as Blackberry and Amazon Fire are also available. In some implementations, the browser may serve as the basis for a platform, such as Chrome, while online services such as Facebook may also provide application programming interfaces that are as expansive as typical mobile platforms.

The mobile operating system provides several fundamental software modules and a common input/output interface that can be used by third party applications via application programming interfaces. This flexible development environment has led to an explosive growth in mobile software applications, also referred to in the art as "apps." Third party apps are typically downloaded to the target device via a dedicated app distribution system specific to the platform, and there are a few simple restrictions to ensure a consistent user experience. User interaction with the mobile device, including the invoking of the functionality of these applications and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users tap, slide, flick, and pinch regions of the sensor panel overlaying the displayed graphical elements with one or more fingers, as well as other multi-gestures and custom multi-gestures, particularly when coupled with corresponding animated display reactions responsive to such actions, may be more intuitive than conventional keyboard and mouse input modalities associated with personal computer systems. Thus, minimal training and instruction is required for the user to operate these devices.

However, as noted previously, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface. Although tablet form factor devices have larger screens than the typical smartphone, compared to desktop or even laptop computer systems, the screen size is still limited.

Expanding beyond the confines of the touch interface, some app developers have utilized the integrated accelerometer as an input means. Some applications such as games are suited for motion-based controls, and typically utilize roll, pitch, and yaw rotations applied to the mobile device as inputs that control an on-screen element. Along these lines, more recent remote controllers for video game console systems also have incorporated accelerometers and other sensors such that motion imparted to the controller is translated to a corresponding virtual action displayed on-screen. Accelerometer data can also be utilized in other contexts, particularly those that are incorporated into wearable devices. However, in these applications, the data is typically analyzed over a wide time period and limited to making general assessments of the physical activity of a user.

Because motion is one of the most native forms of interaction between human beings and tangible objects, it would be desirable to utilize such inputs to the mobile device for controlling user interface elements thereof.

SUMMARY

The present disclosure contemplate various embodiments of multiple streaming camera interfaces. From a client device, it is possible to jump from one camera stream to another by selecting a hotspot that is overlaid on the camera in the position relative to the view of the current camera stream. The system is envisioned to accommodate events in which multiple users are streaming, and the viewer is select a preferred viewpoint or orientation. In other words, camera scene travel is contemplated. The streams may be pre-recorded, or live.

According to one embodiment, the system may have a data processor and a network interface. A data link to a streaming server may be established by the network interface, and the streaming server may be in communication with one or more camera streams generated by corresponding ones of imaging devices capturing footage from specific locations. The system may also include a streaming client that is connectible to the streaming server over the data link established by the network interface. The one or more camera streams may be selectively relayed by the streaming server to the streaming client. There may also be a graphical interface that is executed by the data processor. A first one of the one or more camera streams may be displayed on the graphical interface. The first one of the one or more camera streams may include a hotspot to a second one of the one or more camera streams. In response to an activation of the hotspot, the second one of the one or more camera streams may be displayed on the graphical interface.

Another embodiment of the present disclosure contemplates a method for accessing a plurality of camera streams. The method may include a step of receiving a first one of the plurality of camera streams on a streaming client being executed on a client device. The first one of the plurality of camera streams may include a hotspot corresponding to a second one of the plurality of camera streams. There may also be a step of displaying the first one of the plurality of camera streams on the client device. The hotspot may be positioned in correspondence with the specific location from which a second imaging device generating the second one of the plurality of camera streams is located relative to a view of a first imaging device generating the first one of the plurality of camera streams. Then, the method may include receiving an input corresponding to a selection of the hotspot, followed by a step of requesting the second one of the plurality of camera streams from the streaming client. There may also be a step of receiving the second one of the plurality of camera streams. This method may be implemented as a series of instructions executable by a data processor and tangibly embodied in a program storage medium.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
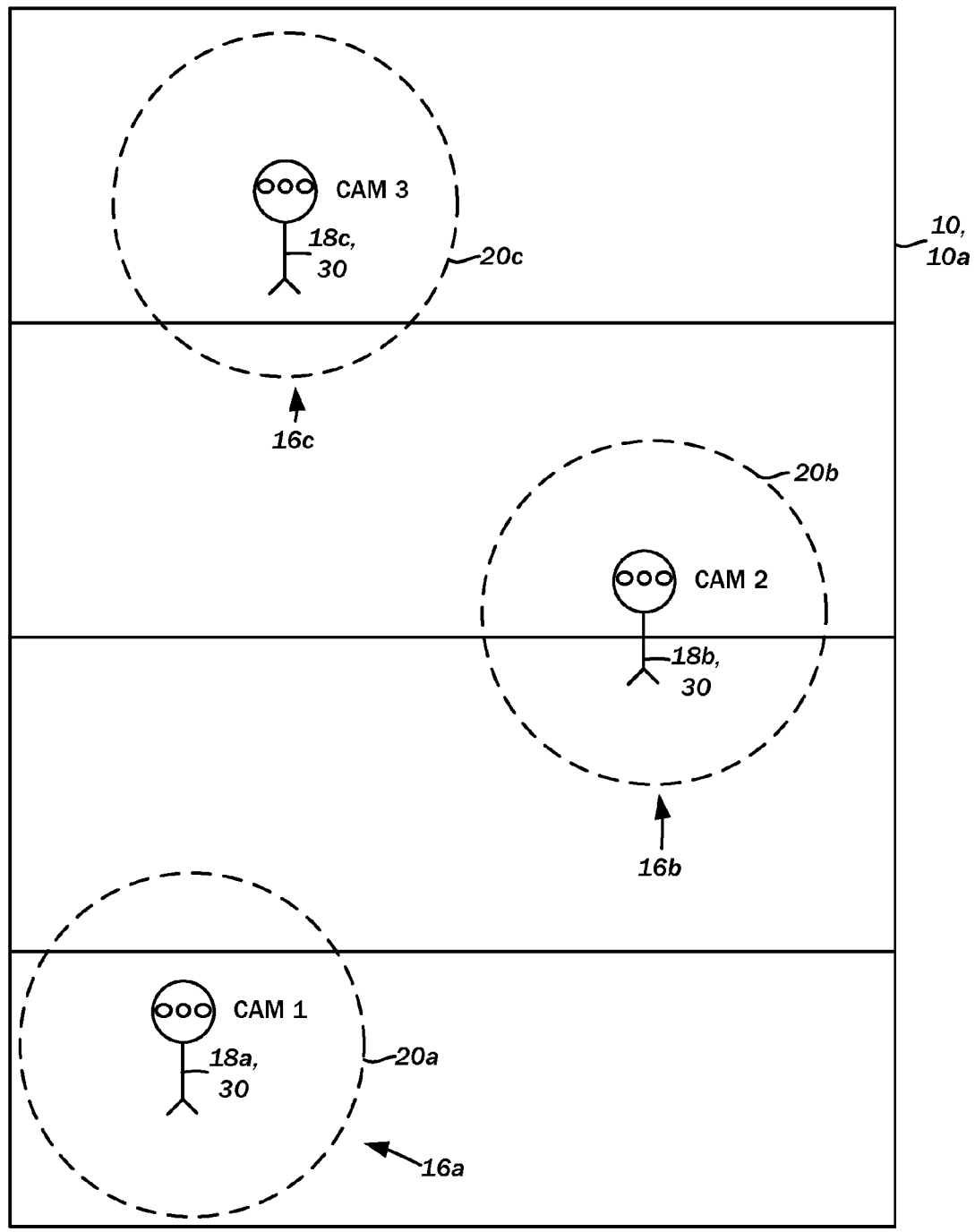
FIG. 1 depicts a physical space with a plurality of cameras positioned therein according to one exemplary implementation of a camera stream navigation interface of the present disclosure.

The present disclosure is directed to an interface and system for navigating multiple cameras that are located throughout a physical space. FIG. 1 is a top plan view of such a physical space 10a defined by one or more boundaries. In one exemplary scenario, the physical space 10, 10a is a rectangular athletic field such as a soccer field, though this may be substituted with any desirable physical space of varying geometric configurations and dimensions, including auditoriums, outdoor parks, and so on. Indeed, the physical space 10 may be expanded to encompass wide geographic areas such as entire cities. The physical space 10a may be host to an athletic event e.g., a soccer game, though the presently disclosure interface and system may be utilized to capture any other event such as rallies, concerts, races, etc.

Figure 2:
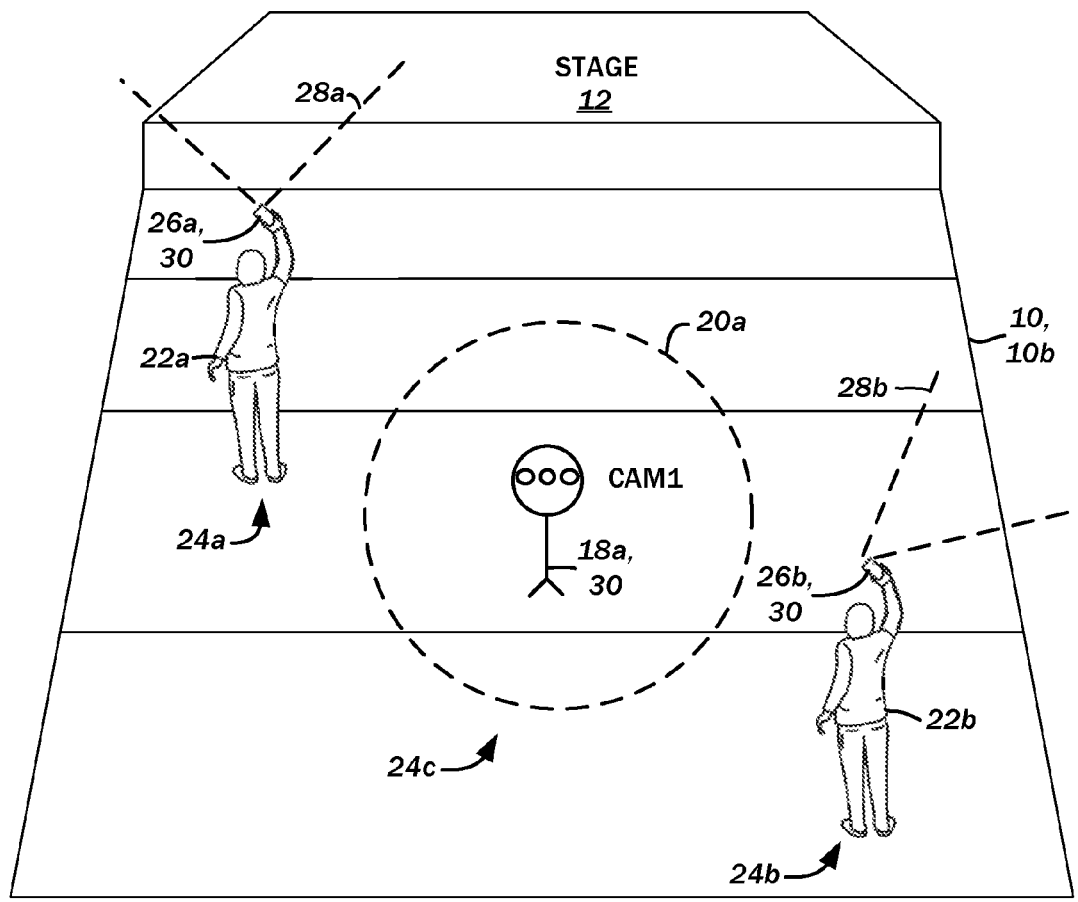
FIG. 2 depicts another physical space with a plurality of stationary and mobile device cameras positioned therein according to an exemplary implementation of the navigation interface.

FIG. 2 is a top plan view of another physical space 10b along these lines, which may be, by way of example, a theater with a stage 12 and audience area 14.

Referring back to the physical space 10a shown in FIG. 1, at a first location 16a, there is a first omnidirectional camera 18a, and at a second location 16b, there is a second omnidirectional camera 18b. Furthermore, at a third location 16c, there may be a third omnidirectional camera 18c. Although only three omnidirectional cameras 18a-18c are depicted, the present system may be expanded to encompass additional omnidirectional cameras as desired or needed for a particular application As referenced herein, the omnidirectional camera 18 refers to an imaging device in which a 360-degree view of the physical space from the perspective of the location 16 in which it is placed can be captured. In this regard, each omnidirectional camera 18a-18c is understood to define a respective field of view 20a-20c that captures different perspectives of the physical space 10. Although the field of view 20 for each omnidirectional camera 18 is depicted with a short radius surrounding the same, it is understood to extend to the resolving limits of the imaging system thereof. There are a variety of omnidirectional cameras known in the art, and any one may be utilized without departing from the scope of the present disclosure. The omnidirectional camera 18 may be implemented with multiple lenses (and accompanying sensors) oriented in different directions to achieve a lateral 360 degree view, though implementations utilizing a single vertically oriented fisheye lens are also possible.

The sensor(s) of the omnidirectional cameras 18 are understood to capture image data within the entirety of the respective fields of view 20. In some cases, there may be additional processing of the captured data to stitch together multiple images for a continuous 360 degree view. As will be appreciated by those having ordinary skill in the art, when presenting the images from the omnidirectional cameras 18 on a display device, the field of view may be limited to that which is perceptible by the human eye, e.g., 120 degrees. Showing the entirety of the 360 degree view may introduce distortion, and may be difficult for the viewer to ascertain details of the scene being presented.

Other devices with integrated imaging sensors such as smartphones, tablets, and the like may also be utilized to capture images in accordance with the present disclosure. In this regard, while one preferred embodiment is implemented with omnidirectional cameras 18, it will be appreciated by those having ordinary skill in the art that the interface and system need not be limited thereto, and more restricted view angle cameras may be utilized. With reference to the physical space 10b shown in FIG. 2, there is a first person/audience member 22a standing at a first location 24a within the audience area 14 proximal to the stage 12 and holding a first mobile device 26a. By way of example, there may also be a second person/audience member 22b standing at a second location 24b within the audience area 14 distant from the stage 12, or at least more distal that the first location 24a. The second person/audience member 22b is holding a second mobile device 26b. The functional details of the mobile devices 26 will explained more fully below, but in general, each is understood to incorporate an imaging device also with prescribed fields of view 28a, 28b.

The first person/audience member 22a is holding the mobile device 26a such that the field of view 28a of its integrated camera is encompasses the stage 12. The second person/audience member 22b, on the other hand, is holding the mobile device 26b with the field of view 28b of the camera being directed to an area to the right of the stage, outside the audience area 14. It is understood that the audience members 22 may change the orientation of the mobile devices 26 over time, and is not restricted to the particular orientations shown in the example. Furthermore, although reference is made to an audience member, this is also exemplary only, and not of limitation. The venue may equip professional videographers with similar mobile devices 26 or other video capture equipment, and also position them within the audience area 14 to capture footage of the event taking place within the physical space 10.

It is expressly contemplated that the aforementioned omnidirectional camera 18 may be concurrently utilized with the mobile devices 26, and so FIG. 2 illustrates the first omnidirectional camera 18a positioned at a third location 24c in the central region of the audience area 14. The omnidirectional camera 18a has a field of view 20a of a substantial entirety of the physical space 10. Hereinafter, the omnidirectional cameras 18 as well as the cameras on the mobile devices 26 will be referred to as imaging devices 30.

According to one embodiment, a stream from the imaging devices 30 may be presented to the viewer. With reference to the block diagram of FIG. 3, the omnidirectional cameras 14a-14c are each connected to a camera server 32 that receives the continuously streaming video data. The camera server 32 is connected to the Internet 34. The mobile devices 26a, 26b likewise capturing video footage may connect to the camera server 32 via the Internet 34, though it is possible for a wireless local area network to be established within the physical space 10, such that a faster and more reliable data link is possible.

A client device 36 that is also connected to the Internet 34 may establish a data communications link to the camera server 32. The client device 36 may be any computing device, including mobile phones, tablets, laptop computers and the like, or any other data processing apparatus that can generate requests for data to the camera server 32, receive the requested data from the camera server 32, and present the video data on a display device of, or otherwise associated with the client device 36. It is understood that various video/audio encoding and decoding procedures take place, but because such techniques will be known to those having ordinary skill in the art, the details thereof will be omitted.

As an alternative to live-streaming, the video streams from the various imaging devices 30 may be pre-recorded for a set duration. In this regard, whether streamed live or streamed from a pre-recorded source, the camera stream will be referenced generally. The present disclosure contemplates both implementations, in which a series of captured footage from various imaging devices 30 is stored on the camera server 32 and transmitted/streamed to the client devices 36 upon request, or streamed live as the footage is captured and uploaded to the camera server 32.

A typical use case for pre-recorded footage is to replay the same in different time zones, a few hours or even a few days after the event concludes, and so on. For example, a major disruptive event (such as a coup d'etat) with multiple reporters, amateur and professional alike, may be recording video footage from various locations throughout a locality. In analyzing the various footage after the unrest, to the extent one stream includes a reference to another stream, or corresponds to a location of a later or earlier recorded stream, such additional stream may be delineated.

Figure 4:
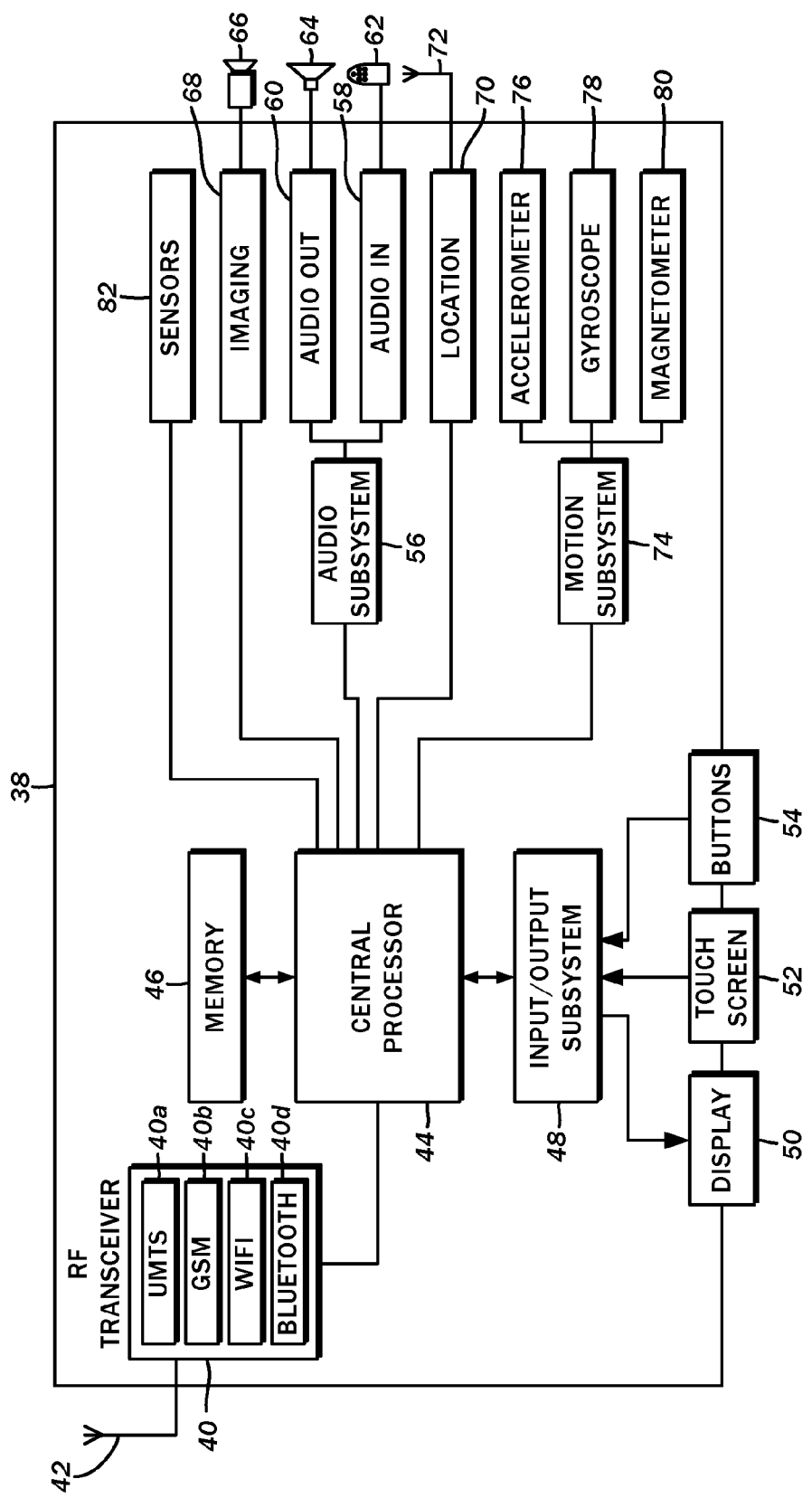
FIG. 4 is a block diagram of a mobile device that may be utilized in connection with the various embodiments of the navigation interface.

FIG. 4 illustrates one exemplary multifunction device 38 on which various embodiments of the present disclosure may be implemented, and is understood to encompass the aforementioned client device 36 that is used to view the video stream, as well as the mobile devices 26 that captures the video stream. Thus, it will be appreciated that the mobile device 26 can be interchangeable with the client device 36, and in the course of one use case, one multifunction device 38 may transition from one role to another.

The multifunction device 38 may be a smartphone, and therefore include a radio frequency (RF) transceiver 40 that transmits and receives signals via an antenna 42. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 40 includes a UMTS module 40a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 40, for example, GSM module 40b. Aside from multiple digital phone technologies, the RF transceiver 40 may implement other wireless communications modalities such as WiFi for local area networking and accessing the Internet by way of local area networks, and Bluetooth for linking peripheral devices such as headsets. Accordingly, the RF transceiver may include a WiFi module 40c and a Bluetooth module 40d. The enumeration of various wireless networking modules is not intended to be limiting, and others may be included without departing from the scope of the present disclosure.

The multifunction device 38 is understood to implement a wide range of functionality through different software applications, which are colloquially known as "apps" in the mobile device context. The software applications are comprised of pre-programmed instructions that are executed by a central processor 44 and that may be stored on a memory 46. There may be other embodiments, however, utilizing self-evolving instructions such as with Artificial Intelligence (AI) systems. The results of these executed instructions may be output for viewing by a user, and the sequence/parameters of those instructions may be modified via inputs from the user. To this end, the central processor 44 interfaces with an input/output subsystem 48 that manages the output functionality of a display 50 and the input functionality of a touch screen 52 and one or more buttons 54. The software instructions comprising apps may be pre-stored locally on the multifunction device 38, though web-based applications that are downloaded and executed concurrently are also contemplated.

In a conventional smartphone device, the user primarily interacts with a graphical user interface that is generated on the display 50 and includes various user interface elements that can be activated based on haptic inputs received on the touch screen 52 at positions corresponding to the underlying displayed interface element. One of the buttons 54 may serve a general purpose escape function, while another may serve to power up or power down the multifunction device 38. Additionally, there may be other buttons and switches for controlling volume, limiting haptic entry, and so forth. Those having ordinary skill in the art will recognize other possible input/output devices that could be integrated into the multifunction device 38, and the purposes such devices would serve. Other smartphone devices may include keyboards (not shown) and other mechanical input devices, and the presently disclosed interaction methods with the graphical user interface detailed more fully below are understood to be applicable to such alternative input modalities.

The multifunction device 38 includes several other peripheral devices. One of the more basic is an audio subsystem 56 with an audio input 58 and an audio output 60 that allows the user to conduct voice telephone calls. The audio input 58 is connected to a microphone 62 that converts sound to electrical signals, and may include amplifier and ADC (analog to digital converter) circuitry that transforms the continuous analog electrical signals to digital data. Furthermore, the audio output 60 is connected to a loudspeaker 64 that converts electrical signals to air pressure waves that result in sound, and may likewise include amplifier and DAC (digital to analog converter) circuitry that transforms the digital sound data to a continuous analog electrical signal that drives the loudspeaker 64. Furthermore, it is possible to capture still images and video via a camera 66 that is managed by an imaging module 68. Again, the camera 66 is referred to generally, and is not intended to be limited to conventional photo sensors. Other types of sensors such as LIDAR, radar, thermal, and so on may also be integrated.

Due to its inherent mobility, users can access information and interact with the multifunction device 38 practically anywhere. Additional context in this regard is discernible from inputs pertaining to location, movement, and physical and geographical orientation, which further enhance the user experience. Accordingly, the multifunction device 38 includes a location module 70, which may be a Global Positioning System (GPS) receiver that is connected to a separate antenna 72 and generates coordinates data of the current location as extrapolated from signals received from the network of GPS satellites. Motions imparted upon the multifunction device 38, as well as the physical and geographical orientation of the same, may be captured as data with a motion subsystem 74, in particular, with an accelerometer 76, a gyroscope 78, and/or a compass/magnetometer 80, respectively. Although in some embodiments the accelerometer 76, the gyroscope 78, and the compass 80 directly communicate with the central processor 44, more recent variations of the multifunction device 38 utilize the motion subsystem 74 that is embodied as a separate co-processor to which the acceleration and orientation processing is offloaded for greater efficiency and reduced electrical power consumption. One exemplary embodiment of the multifunction device 38 is the Apple iPhone with the M7 motion co-processor.

The components of the motion subsystem 74, including the accelerometer 76, the gyroscope 78, and the magnetometer 80, while shown as integrated into the multifunction device 38, may be incorporated into a separate, external device. This external device may be wearable by the user and communicatively linked to the multifunction device 38 over the aforementioned data link modalities. The same physical interactions contemplated with the multifunction device 38 to invoke various functions as discussed in further detail below may be possible with such external wearable device.

There are other sensors 82 that can be utilized in the multifunction device 38 for different purposes. For example, one of the other sensors 82 may be a proximity sensor to detect the presence or absence of the user to invoke certain functions, while another may be a light sensor that adjusts the brightness of the display 50 according to ambient light conditions. Those having ordinary skill in the art will recognize that other sensors 82 beyond those considered herein are also possible.

Figure 5:
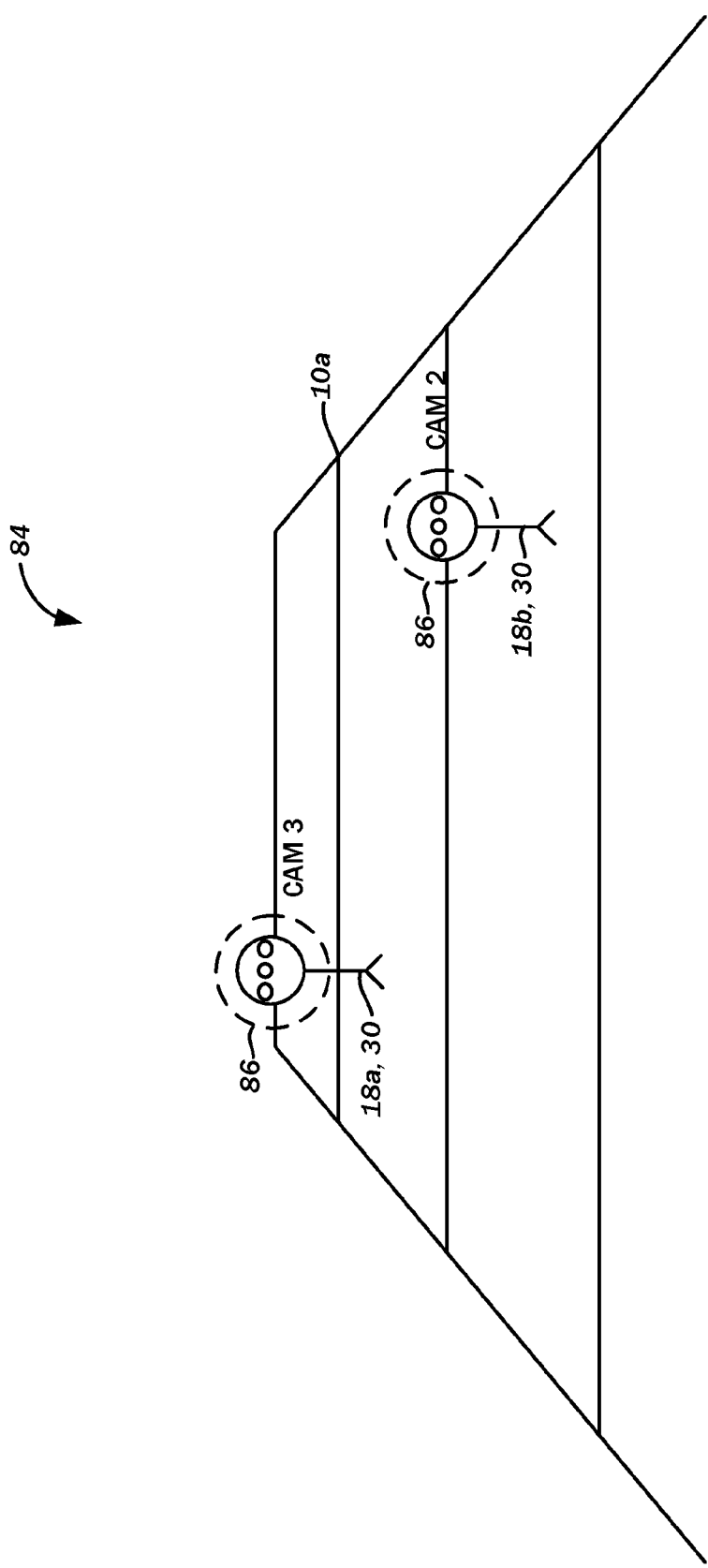
FIG. 5 is a view of the physical space as depicted in FIG. 1, from the perspective of a first omnidirectional camera.

Referring now to FIG. 5, a scene 84 represents a portion of the image of the physical space 10a captured by the first omnidirectional camera 18a and presented on the client device 36. As shown, the second omnidirectional camera 18b as well as the third omnidirectional camera 18c is within the field of view. Although only a portion is shown, it is understood that the entirety of the field of view is accessible by way of navigation inputs to the client device 36 that modify the subsection of the field of view that is displayed. In one implementation, the left, right, top, or bottom edges of the display 50/touch screen 52 may be tapped to move the field of view by a preset amount. Alternatively, the client device 36 may be rotated or tilted, with the accompanying motion being captured by the sensors connected to the motion subsystem 74. The data from the sensors can be used to translate the field of view of the scene 84 as presented on the display 50.

Within the scene 84, those portions corresponding to the other imaging devices 30 within the physical space 10a may be designated as a hotspot 86 that is capable of accepting touch or other input. When such hotspots 86 are activated, the view/perspective may be changed to that of the imaging devices 30 that is so selected. In some embodiments, the hotspots 86 may be designated manually for each imaging device 30. Alternatively, each imaging device 30 may capture location data that is reported to the camera server 32, with the hotspots 86 being overlaid on the video stream of the other imaging devices 30 based upon such reported location data. In this regard, some of the imaging devices 30 may be statically positioned, while others may be moved by an operator, with the hotspots 86 being correspondingly moved in each of the video streams of the other imaging devices 30 from the location data.

Figure 3:
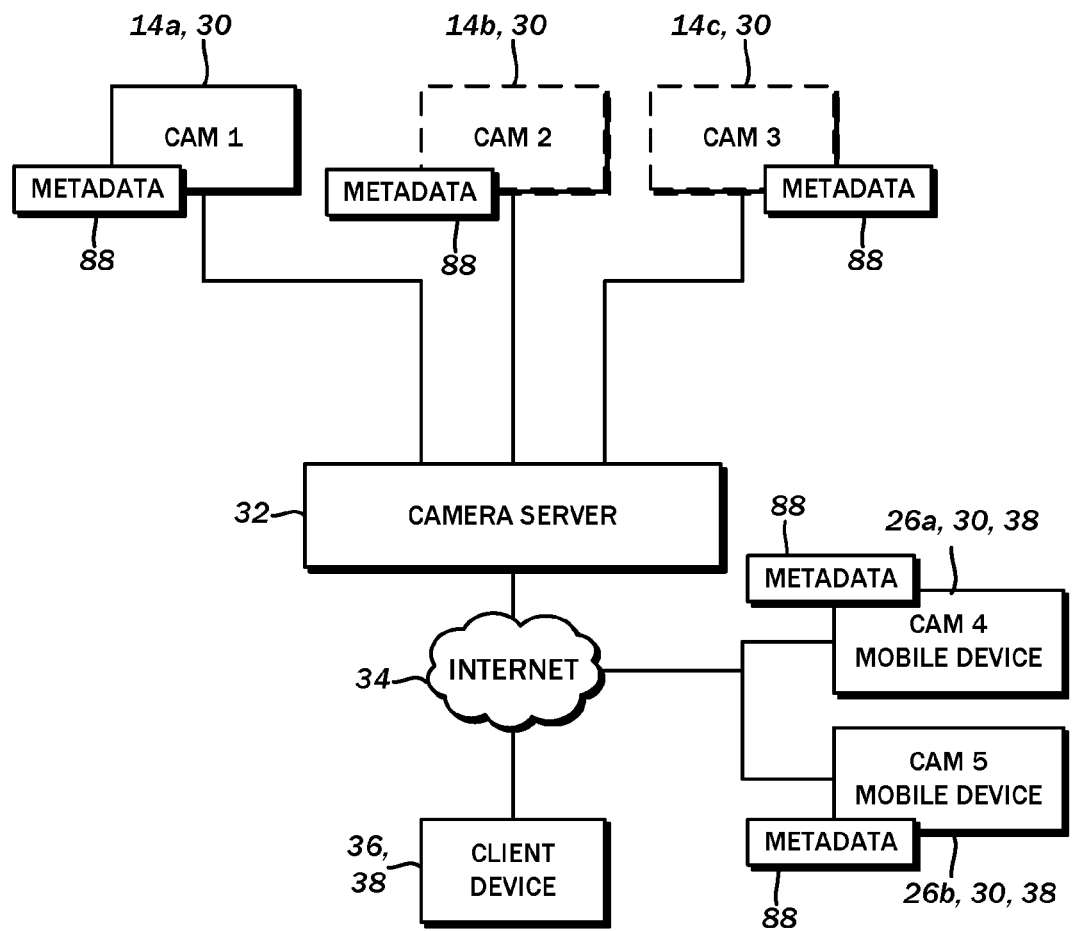
FIG. 3 is a block diagram of the various components of the navigation interface.

As shown in the block diagram of FIG. 3, the video data streams from each of the imaging devices 30 is understood to be accompanied by metadata 88, which includes information pertaining to the current location of the imaging device 30 at a minimum. The location data may be based off GPS coordinates as derived by an on-board GPS receiver, or may be based off other telemetry data. Near Field Communications (NFC) may be utilized to exchange camera selection precedence as between nearby imaging devices 30 as well. Furthermore, the metadata 88 may include orientation data, e.g., the angle at which the imaging device 30 is pointed, along with altitude information that may be acquired from altimeters and/or barometers that are integrated therein. It is also understood that the GPS receiver may also provide altitude data. Such altitude information is understood to provide more accurate real-world positioning and improved user experience, particularly in more expansive physical spaces such as stadiums, hillsides, and so forth. The location/positioning/orientation metadata may be derived from individual sensors that are integrated into the imaging device 30, though depth-sensing cameras may also be utilized, further increasing the accuracy of the metadata 88.

Figure 6B:
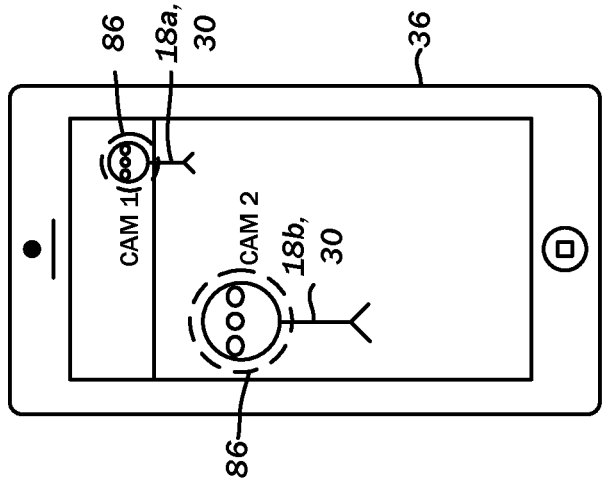
FIG. 6B is a user interface showing the view of the physical space as captured by the third omnidirectional camera upon transitioning from the view from the perspective of the first omnidirectional camera in accordance with the present disclosure.
Figure 6A:
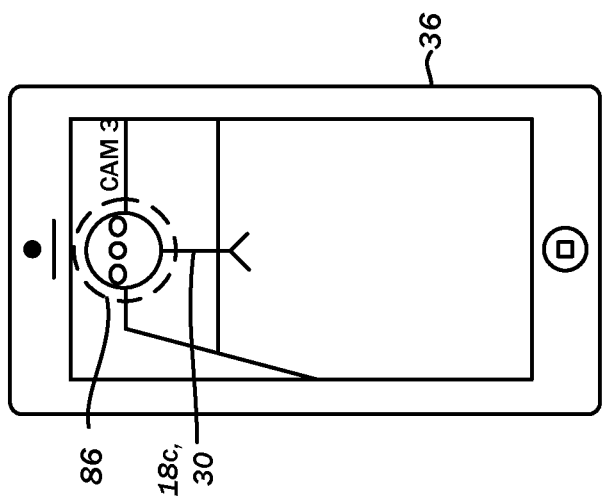
FIG. 6A is a user interface showing the view of the physical space as captured by the first omnidirectional camera.

FIGS. 6A-6B are exemplary representations of a display interface presented on the client device 36 as the user navigates from the view of one imaging device 30 to another. FIG. 6A in particular represents a view from the first omnidirectional camera 18a with a narrowed field of view that excludes the second omnidirectional camera 18b while showing the third omnidirectional camera 18c. It is possible to transition to the view of this third omnidirectional camera 18d by tapping the hotspot 86. The camera server 32 switches the video data stream that is transmitted to the client device 36 to the one from the third omnidirectional camera 18c. FIG. 6B is an exemplary representation of the view of the third omnidirectional camera 18c, with a wider angle of view that includes the first omnidirectional camera 18a and the second omnidirectional camera 18b.

Figure 6D:
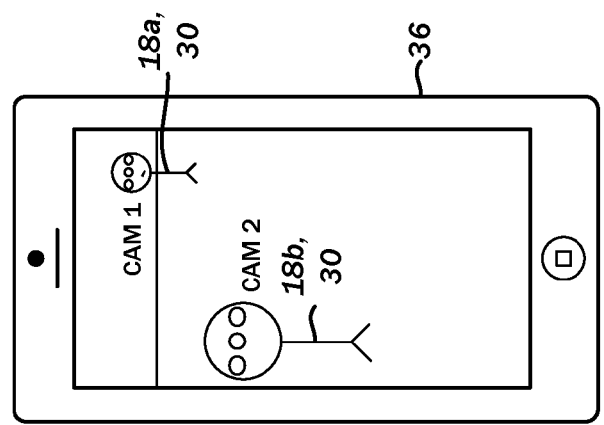
FIG. 6D is a user interface showing the view of the physical space as captured by the third omnidirectional camera upon transitioning from the view from the perspective of the first omnidirectional camera.
Figure 6C:
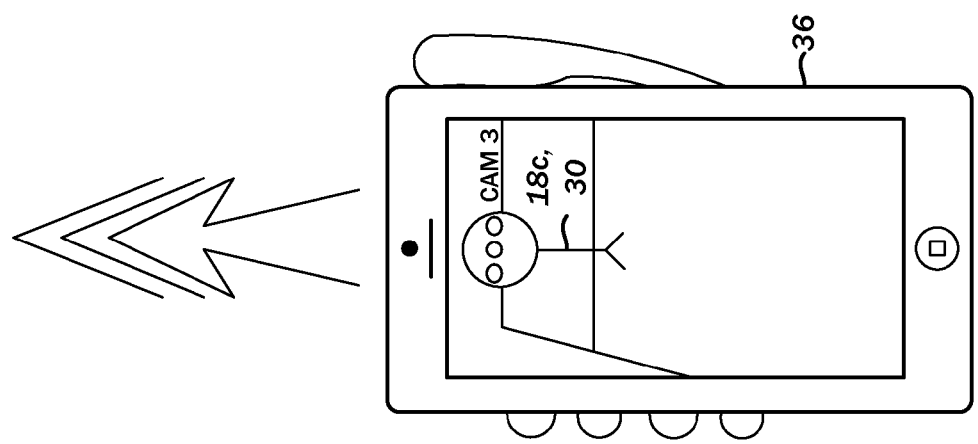
FIG. 6C is a user interface showing the view of the physical space with a motion input being applied to the client device.

Referring to the screen shots of the client device 36 shown in FIGS. 6C and 6D, an alternative modality for transitioning from the view of one imaging device 30 to another is depicted. With the third omnidirectional camera 18c within view, the user may input a rapid forward motion on the client device 36. In response to this input, the display may be transitioned to that shown in FIG. 6D, for example, which is identical to the view from the third omnidirectional camera 18c as depicted in FIG. 6B, except without the hotspot 86. Again, in this view, the second omnidirectional camera 18b and the first omnidirectional camera 18a are shown, as corresponding to the positioning of the omnidirectional cameras 18 depicted in FIG. 1.

As the imaging devices 30 are moved and the view orientations are changed, updated metadata 88 is understood to accompany the video stream. Upon receipt of the metadata 88 by the camera server 32, the position of each of the imaging devices 30 within a generated map of the physical space 10 can be updated, along with the positioning of the hotspots 86 shown on the client devices 36.

Figure 7:
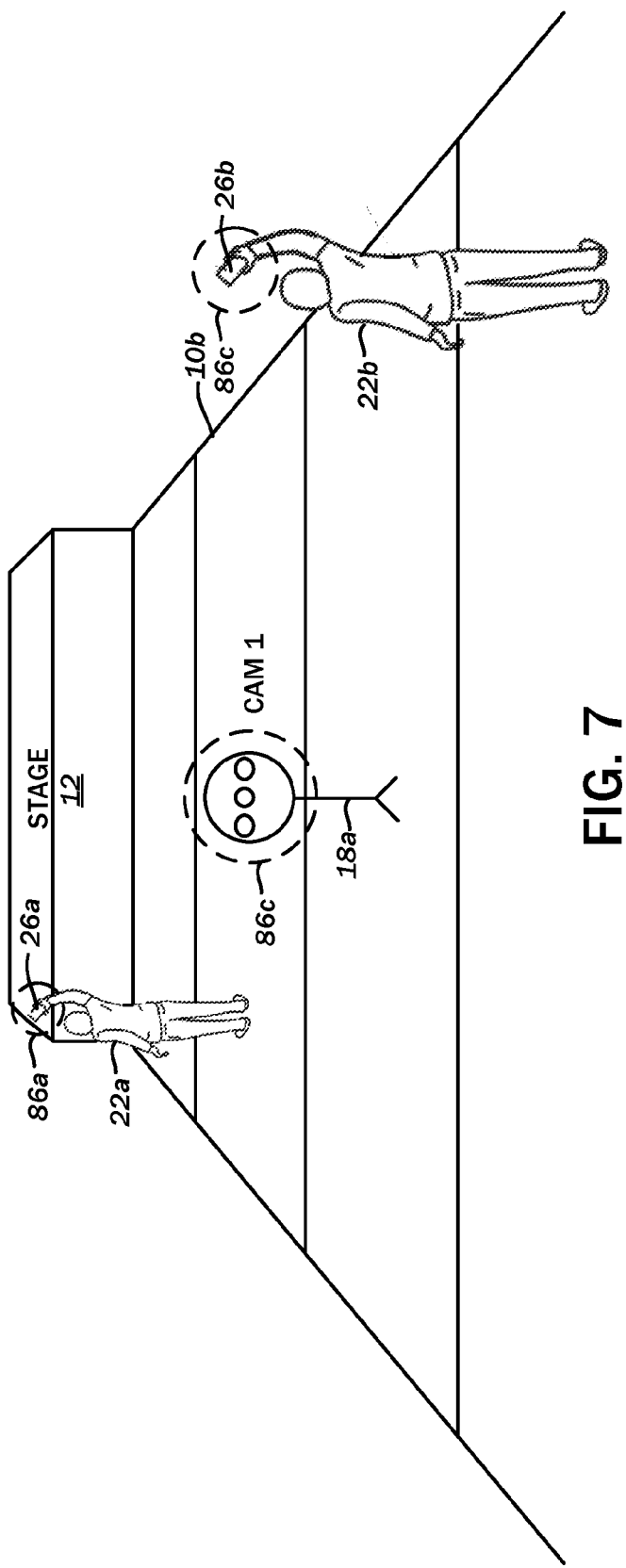
FIG. 7 is a view of the physical space as depicted in FIG. 2, from the perspective of a first mobile device.

FIG. 7 depicts another scene 90 representing a portion of the image of the physical space 10b, a top view of which is shown in FIG. 2. The view represents that of another imaging device 30 that was not depicted in FIG. 2, but shows the first audience member 22a, the second audience member 22b, and the first omnidirectional camera 18a. Each of the imaging devices 30, as presented within the view, has a corresponding hotspot 86 overlaid thereon. That is, the first mobile device 26a held by the first audience member 22a has a first hotspot 86a, the second mobile device 26b held by the second audience member 22b has a second hotspot 86b, and the first omnidirectional camera 18a has a third hotspot 86c.

Figure 8B:
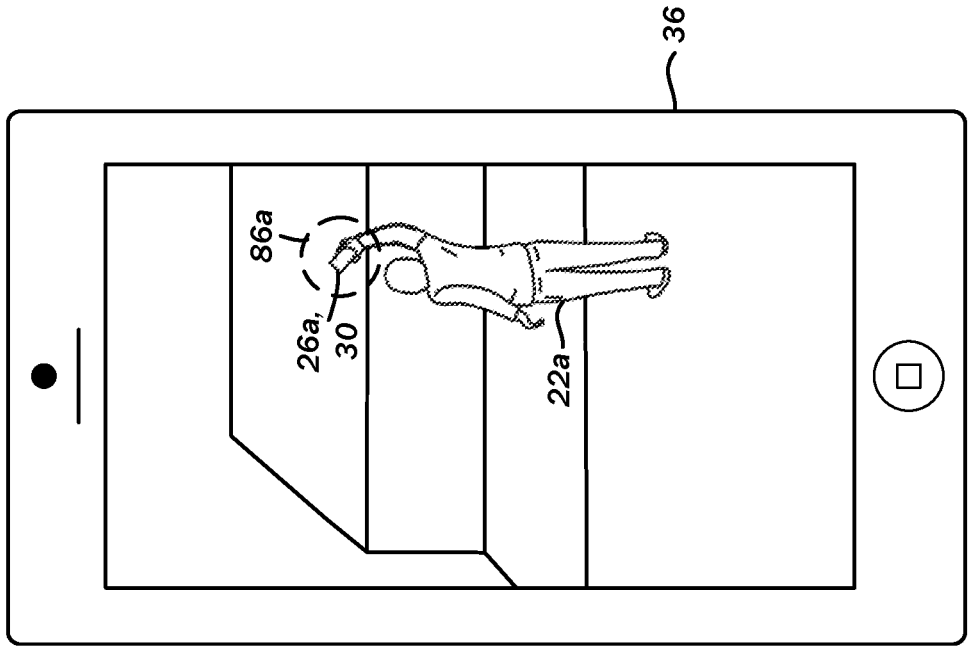
FIG. 8B is a user interface showing the view of the physical space as captured by the first omnidirectional camera with the first audience member in a different location.
Figure 8A:
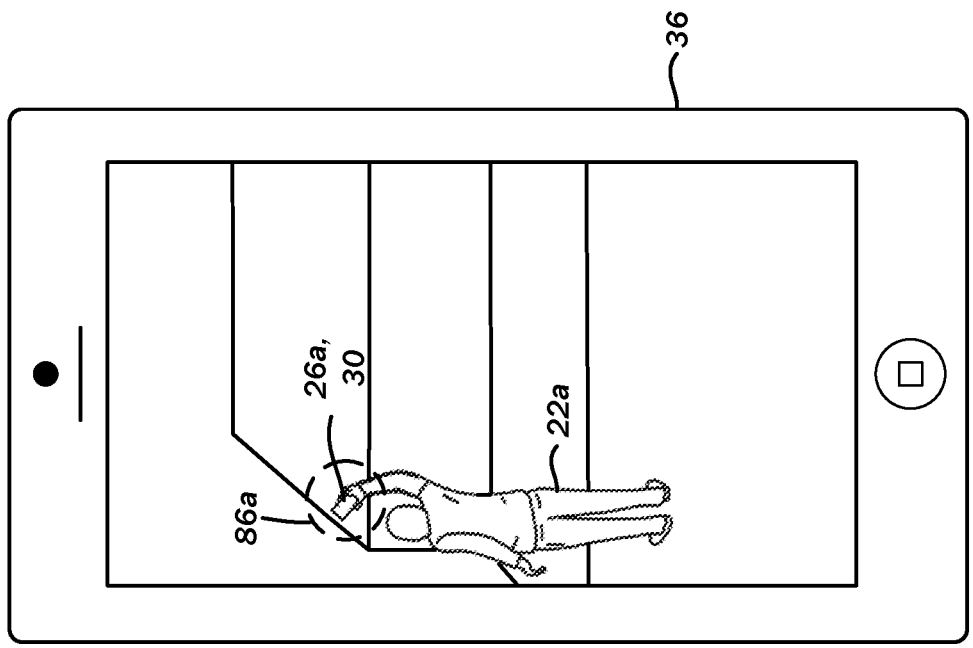
FIG. 8A is a user interface showing the view of another physical space as captured by the first omnidirectional camera, including a first audience member in one location.

By way of example, once the user of the client device 36 selects the third hotspot 86c, the displayed video stream is switched to that of the first omnidirectional camera 18a. Referring to FIG. 8A, the first audience member 22a is shown as before, holding the first mobile device 26a/ imaging device 30, with the hotspot 86a overlaid thereon. FIG. 8 depicts a scene in which the first audience member 22a moves to the center of the stage while continuing with the video capture. The view as captured by the first omnidirectional camera 18a is updated, showing the first audience member 22a in the position to which he moved. The hotspot 86a is repositioned from that shown in FIG. 8A, and continues to be overlaid on the portion of the scene corresponding to the first mobile device 26a. Selecting the hotspot 86a, in turn, is understood to switch the video stream to that of the first mobile device 26a.

To the extent there are multiple audience members 22 and the display begins to get crowded with the hotspots 86, subdivided regions within the display that have more than a threshold number may be aggregated into a single hotspot. Selecting the aggregated hotspot may be operable to zoom in the view of the display to the specific subdivided region, and showing the hotspots therein individually.

The system may facilitate-streaming services in which the user of the client device 36 is able to jump or advance from one view/stream to another, or to different viewing angles and orientations. Many public events attract attendees who are interested in live-streaming, and the system of the present disclosure is understood to allow the remote viewer to select between these streams to view the event from optimal locations.

Figure 9:
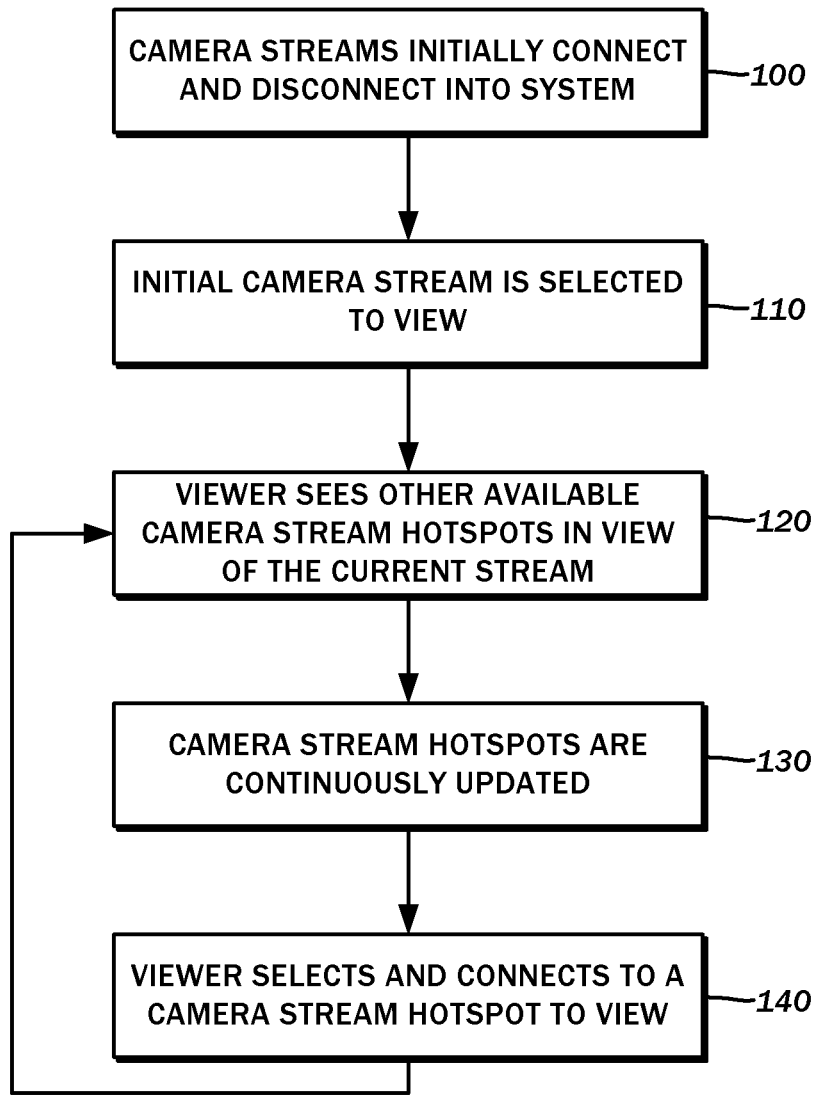
FIG. 9 is a flowchart depicting one exemplary execution sequence of a method for navigating multiple cameras.

With reference to the flowchart of FIG. 9, a method in accordance with the present disclosure begins with a step 100 of each of the individual imaging devices 30 or cameras connecting to the camera server 32. It will be appreciated by those having ordinary skill in the art that the audience member 22 may invoke an app that initiates the connection to the camera server 32, and presents the common video capture interface of the mobile device 26 (which may include a record button, a stop recording button, filters, etc.). Once recording is initiated, the mobile device 26 begins capturing the image data with the onboard camera 66, and transmits the same to the camera server 32. This data may be temporarily stored on the camera server 32 before forwarding to the requesting client devices 36.

The user on the client device 36 may likewise initiate an app that connects to the camera server 32 in accordance with a step 110. To the extent the client device 36 is a standalone computer system rather than a mobile device, the camera server 32 may be accessed via a browser. Once the client device 36 begins downloading the initial stream, other available streams may be indicated within the user interface as described above, according to a step 120. As the initial stream continues, according to a step 130, the hotspots 86 are updated. If a stream from what appears to be a better vantage point appears in the current stream, the user has the option to select such other stream per step 140. This process may continue so long as the user selects different streams from the currently viewing stream, or until the event concludes and the camera server 32 is deactivated.

Figure 10:
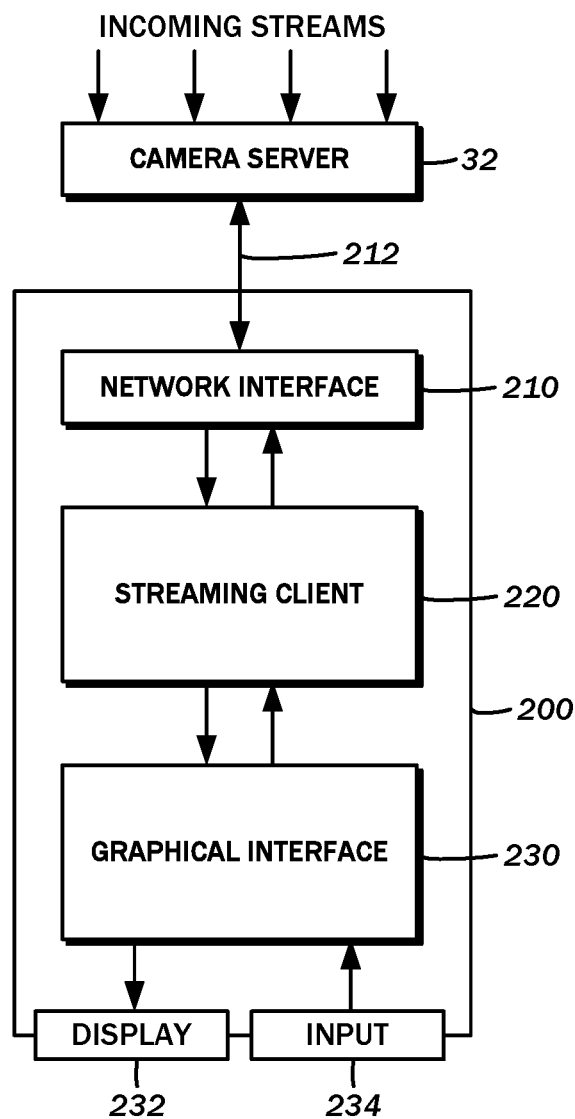
FIG. 10 is a block diagram of one embodiment of a multiple streaming camera interface system in accordance with the present disclosure.

The block diagram of FIG. 10 illustrates one embodiment of a multiple view camera interface system 200 that may be implemented on, for example, the client device 36. As discussed above, the camera server 32 accepts one or more video/image streams from the various imaging devices 30, and selectively transmits one for display on the client device 36. The system 200 includes a network interface 210, with a data link 212 being established thereby to the camera server 32. The client device 36 is understood to connect to the Internet 34, and in this regard, the network interface 210 may connect thereto. Those having ordinary skill in the art will recognize the various components and modules necessary to implement an Internet connection, so the details thereof will be omitted for the sake of brevity.

In the system 200, there is a streaming client 220 that connects to the camera server 32 over the data link 212. The streaming client 220 is understood to implement the various streaming protocols over appropriate data link layers, and is configured to receive the video/image streams from the camera server 32.

The system 200 also incorporates a graphical interface 230. In accordance with one preferred embodiment, the graphical interface 230 is implemented as a software module and executed by a data processor of the system 200. Upon being downloaded/retrieved by the streaming client 220, the graphical interface 230 is understood to display the camera stream on a display device 232. As discussed above, to the extent the camera stream has a field of view of the physical space 10 of another imaging device 30, the camera server 32 recognizes it as such adds the aforementioned hotspot(s) 86 to the corresponding location within the video image. This processing may take place at the streaming client 220 or the graphical interface 230 with accompanying location and/or altitude information transmitted as the metadata 88 from the respective imaging devices 30. Upon selection of the hotspot 86 via an input device 234 to the graphical interface 230, that selected camera stream is retrieved and output instead.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A multiple streaming camera interface system, comprising:
   a data processor;
   a network interface, a data link to a streaming server being established by the network interface, and the streaming server being in communication with one or more camera streams generated by corresponding ones of imaging devices capturing footage from specific locations;
   a streaming client connectible to the streaming server over the data link established by the network interface, the one or more camera streams being selectively relayed by the streaming server to the streaming client; and
   a graphical interface executed by the data processor, a first one of the one or more camera streams being displayed on the graphical interface, the first one of the one or more camera streams including a hotspot to a second one of the one or more camera streams, in response to an activation of the hotspot the second one of the one or more camera streams being displayed on the graphical interface.

2. The system of claim 1, wherein the hotspot is positioned in correspondence with the specific location from which the imaging device generating the second one of the one or more camera streams is located.

3. The system of claim 2, wherein the hotspot is positioned relative to a view of the imaging device generating the second one of the or more camera streams in the first one of the one or more camera streams.

4. The system of claim 1, wherein positioning of the hotspot is based upon reported location coordinates from a Global Positioning System receiver integrated in the imaging device generating the second one of the one or more camera streams.

5. The system of claim 1, wherein positioning of the hotspot is based upon reported altitude data from the imaging device generating the second one of the one or more camera streams.

6. The system of claim 5, wherein the altitude data is derived from an altimeter integrated into the imaging device.

7. The system of claim 5, wherein the altitude data is derived from a Global Positioning System receiver integrated into the imaging device.

8. The system of claim 1, further comprising:
   one or more motion sensors, the second one of the or more camera streams being displayed on the graphical interface in response to a motion detected by the one or more motion sensors.

9. The system of claim 1, wherein at least one of the imaging devices is an omnidirectional camera.

10. The system of claim 1, wherein at least one of the imaging devices is a camera integrated into a mobile communications device.

11. A method for accessing a plurality of camera streams, the method comprising:
   receiving, on a streaming client being executed on a client device, a first one of the plurality of camera streams, the first one of the plurality of camera streams including a hotspot corresponding to a second one of the plurality of camera streams;

displaying the first one of the plurality of camera streams on the client device, the hotspot being positioned in correspondence with the specific location from which a second imaging device generating the second one of the plurality of camera streams is located relative to a view of a first imaging device generating the first one of the plurality of camera streams;

receiving an input corresponding to a selection of the hotspot;

requesting, from the streaming client, the second one of the plurality of camera streams; and receiving the second one of the plurality of camera streams.

12. The method of claim 11, further comprising:

receiving an update to the position of the hotspot in response to the second imaging device being re-positioned; and updating the positioning of the hotspot on the display of the first one of the plurality of camera streams.

13. The method of claim 11 wherein positioning of the hotspot is based upon reported location coordinates from a Global Positioning System receiver integrated in the imaging device generating the second one of the plurality of camera streams.

14. The method of claim 11, wherein positioning of the hotspot is based upon reported altitude data from the imaging device generating the second one of the plurality of camera streams.

15. The method of claim 14, wherein the altitude data is derived from an altimeter integrated into the imaging device generating the second one of the plurality of camera streams.

16. The method of claim 14, wherein the altitude data is derived from a Global Positioning System receiver integrated into the imaging device generating the second one of the plurality of camera streams.

17. The method of claim 11, wherein the imaging device generating the second one of the plurality of camera streams is an omnidirectional camera.

18. The method of claim 11, wherein the imaging device generating the second one of the plurality of camera streams is a camera integrated into a mobile communications device.

19. The method of claim 11, further comprising:

displaying the second one of the plurality of live camera streams.

20. An article of manufacture comprising a non-transitory program storage medium readable by a computing device, the medium tangibly embodying one or more programs of instructions executable by the device to perform a method for accessing a plurality of camera streams, the method comprising:

receiving, on a streaming client being executed on a client device, a first one of the plurality of camera streams, the first one of the plurality of camera streams including a hotspot corresponding to a second one of the plurality of camera streams;

displaying the first one of the plurality of camera streams on the client device, the hotspot being positioned in correspondence with the specific location from which a second imaging device generating the second one of the plurality of camera streams is located relative to a view of a first imaging device generating the first one of the plurality of camera streams;

receiving an input corresponding to a selection of the hotspot;

requesting, from the streaming client, the second one of the plurality of camera streams; and receiving the second one of the plurality of camera streams.

* * * * *